US007745005B2

(12) United States Patent
Tinianov (10) Patent No.: US 7,745,005 B2
(45) Date of Patent: Jun. 29, 2010

(54) ACOUSTICAL SOUND PROOFING MATERIAL

(75) Inventor: Brandon D. Tinianov, Santa Clara, CA (US)

(73) Assignee: Serious Materials, Inc., Sunnyvale, CA (US)

( * ) Notice: Subject to any disclaimer, the term of this patent is extended or adjusted under 35 U.S.C. 154(b) by 173 days.

(21) Appl. No.: 11/772,197

(22) Filed: Jun. 30, 2007

(65) Prior Publication Data
US 2009/0000866 A1 Jan. 1, 2009

(51) Int. Cl.
B32B 37/00 (2006.01)
(52) U.S. Cl. .................. 428/411.1; 181/290; 156/60
(58) Field of Classification Search .......... 428/411.1; 181/290; 156/60
See application file for complete search history.

(56) References Cited

U.S. PATENT DOCUMENTS

| | | | | |
|---|---|---|---|---|
| 3,092,250 | A | * | 6/1963 | Knutson et al. ............. 428/344 |
| 3,828,504 | A | | 8/1974 | Egerborg et al. |
| 4,364,017 | A | * | 12/1982 | Tokunaga et al. ........... 333/194 |
| 4,663,224 | A | | 5/1987 | Tabata et al. |
| 5,256,223 | A | | 10/1993 | Alberts et al. |
| 5,342,465 | A | | 8/1994 | Bronowicki et al. |
| 5,473,122 | A | | 12/1995 | Kodiyalam et al. |
| 5,474,840 | A | | 12/1995 | Landin |
| 5,585,178 | A | * | 12/1996 | Calhoun et al. ............. 428/343 |
| 5,691,037 | A | | 11/1997 | McCutcheon et al. |
| 5,945,643 | A | * | 8/1999 | Casser ........................ 181/290 |
| 6,123,171 | A | | 9/2000 | McNett et al. |
| 6,381,196 | B1 | | 4/2002 | Hein et al. |
| 7,041,377 | B2 | | 5/2006 | Miura et al. |
| 2003/0006090 | A1 | | 1/2003 | Reed |
| 2005/0050846 | A1 | * | 3/2005 | Surace et al. ............... 52/782.1 |
| 2005/0080193 | A1 | * | 4/2005 | Wouters et al. ............. 525/191 |
| 2006/0108175 | A1 | * | 5/2006 | Surace et al. ............... 181/285 |
| 2007/0094950 | A1 | | 5/2007 | Surace et al. |

FOREIGN PATENT DOCUMENTS

| | | |
|---|---|---|
| CA | 2219785 | 10/1996 |
| JP | 09-203153 | 8/1997 |
| WO | WO 96/34261 | 10/1996 |

OTHER PUBLICATIONS

Pritz. "Loss Factor Peak of Viscoelastic Materials: Magnitude to Width Relations", J. of Sound and Vibration, 246(2): 265-280, 2001.*
Notification of Transmittal of the International Search Report in corresponding International Application No. PCT/US08/68861 dated Sep. 5, 2008 (1 page).
International Search Report in corresponding International Application No. PCT/US08/68861 dated Sep. 5, 2008 (2 pages).
Written Opinion of the International Searching Authority in corresponding International Application No. PCT/US08/68861 dated Sep. 5, 2008 (8 pages).
Notification of Transmittal of the International Search Report in corresponding International Application No. PCT/US08/68863 dated Sep. 17, 2008 (1 page).
International Search Report in corresponding International Application No. PCT/US08/68863 dated Sep. 17, 2008 (2 pages).
Written Opinion of the International Searching Authority in corresponding International Application No. PCT/US08/68863 dated Sep. 17, 2008 (7 pages).
English Language Abstract, JP Patent First Publication No. 09-203153, Aug. 5, 1997, (2 pages).
*A Study of Techniques to Increase the Sound of Insulation of Building Elements*, Wyle Laboratories, Prepared for Dept. of Housing and Urban Development, Jun. 1973 (16 pages).
*Field Sound Insulation Evaluation of Load-Beating Sandwich Panels for Housing*, Final Report, Prepared by Robert E. Jones, Forest Products Laboratory, Forest Service, U.S. Department of Agriculture, Aug. 1975 (53 pages).
*Sound Studio Construction on a Budget*, F. Alton Evererst, McGraw-Hill, 1997 (7 pages).
*Wood Handbook/Wood as an Engineering Material*, United States Department of Agriculture, Forest Service, General Technical Report FPL-GTR-113, Mar. 1999 (24 pages).
*Transmission Loss of Plasterboard Walls* by T. D. Northwood, Building Research Note, Division of Building Research, National Research Counsel, Ottawa, Canada (10 pages), Jan. 19, 1970.
*A Guide to Airborne, Impact, and Structureborne Noise Control in Multifamily Dwellings*, U. S. Department of Housing and Urban Development, Prepared for the National Bureau of Standards, Washington, D. C., Jan. 1963 (5 pages).

(Continued)

*Primary Examiner*—David R Sample
*Assistant Examiner*—Lawrence D Ferguson
(74) *Attorney, Agent, or Firm*—Haynes and Boone, LLP (57) ABSTRACT

Panels for use in building construction (partitions, walls, ceilings, floors or doors) which exhibit improved acoustical sound proofing in multiple specific frequency ranges comprise laminated structures having as an integral part thereof one or more layers of viscoelastic material of varied shear moduli which also function as a glue and energy dissipating layer; and, in some embodiments, one or more constraining layers, such as gypsum, cement, metal, cellulose, wood, or petroleum-based products such as plastic, vinyl, plastic or rubber. In one embodiment, standard wallboard, typically gypsum, comprises the external surfaces of the laminated structure.

18 Claims, 6 Drawing Sheets

OTHER PUBLICATIONS

*Transmission Loss of Leaded Building Materials*, Paul B. Ostergaard, Richmond L. Cardinell, and Lewis S. Goodfriend, The Journal of the Acoustical Society of America, vol. 35, No. 6, Jun. 1963 (7 pages).

*Dictionary of Architecture & Construction 2200 illustrations*, Third Edition, Edited by Cyril M. Harris, Professor Emeritus of Architecture Columbia University, McGraw-Hill, 2000 (7 pages).

*Dictionary of Engineering Materials*, Harald Keller, Uwe Erb, Wiley-Interscience by John Wiley & Sons, Inc. 2004 (4 pages).

*Chamber Science and Technology Dictionary*, by Professor Peter M. B. Walker, W & R Chambers Ltd and Cambridge University Press, 1988 (3 pages).

\* cited by examiner

ACOUSTICAL SOUND PROOFING MATERIAL

BACKGROUND

Noise control constitutes a rapidly growing economic and public policy concern for the construction industry. Areas with high acoustical isolation (commonly referred to as 'soundproofed') are requested and required for a variety of purposes. Apartments, condominiums, hotels, schools and hospitals all require rooms with walls, ceilings and floors that reduce the transmission of sound thereby minimizing, or eliminating, the disturbance to people in adjacent rooms. Soundproofing is particularly important in buildings adjacent to public transportation, such as highways, airports and railroad lines. Additionally theaters, home theaters, music practice rooms, recording studios and the like require increased noise abatement. Likewise, hospitals and general healthcare facilities have begun to recognize acoustical comfort as an important part of a patient's recovery time. One measure of the severity of multi-party residential and commercial noise control issues is the widespread emergence of model building codes and design guidelines that specify minimum Sound Transmission Class (STC) ratings for specific wall structures within a building. Another measure is the broad emergence of litigation between homeowners and builders over the issue of unacceptable noise levels. To the detriment of the U.S. economy, both problems have resulted in major builders refusing to build homes, condos and apartments in certain municipalities; and in widespread cancellation of liability insurance for builders. The International Code Council has established that the minimum sound isolation between multiple tenant dwellings or between dwellings and corridors is a lab certified STC 50. Regional codes or builder specifications for these walls are often STC 60 or more. It is obvious that the problem is compounded when a single wall or structure is value engineered to minimize the material and labor involved during construction.

It is helpful to understand how STC is calculated in order to improve the performance of building partitions. STC is a single-number rating that acts as a weighted average of the noise attenuation (also termed transmission loss) of a partition across many acoustical frequencies. The STC is derived by fitting a reference rating curve to the sound transmission loss (TL) values measured for the 16 contiguous one-third octave frequency bands with nominal mid-band frequencies of 125 Hertz (Hz) to 4000 Hertz inclusive, by a standard method. The reference rating curve is fitted to the 16 measured TL values such that the sum of deficiencies (TL values less than the reference rating curve), does not exceed 32 decibels, and no single deficiency is greater than 8 decibels. The STC value is the numerical value of the reference contour at 500 Hz. For maximum STC rating, it is desirable for the performance of a partition to match the shape of the reference curve and minimize the total number of deficiencies.

An example of materials poorly designed for performance according to an STC-based evaluation is evident in the case of many typical wood framed wall assemblies. A single stud wall assembly with a single layer of type X gypsum wallboard on each side is recognized as having inadequate acoustical performance. That single stud wall has been laboratory tested to an STC 34—well below building code requirements. A similar wall configuration consisting of two layers of type X gypsum wall board on one side and a single layer of type X gypsum board on the other is an STC 36—only a slightly better result. In both cases, the rating of the wall is limited by poor transmission loss at 125, 160 and 2500 Hz. In many cases, the performance is about five to ten decibels lower than it is at other nearby frequencies. For example, at 200 Hz, the wall performs about 12 decibels better than it does at the adjacent measurement frequency, 160 Hz. Similarly, the same assembly performs five decibels better at 3150 Hz than it does at 2500 Hz.

Additionally, some walls are not designed to perform well with specific regard to an STC curve, but rather to mitigate a specific noise source. A good example is that of home theater noise. With the advent of multi-channel sound reproduction systems, and separate low frequency speakers (termed 'subwoofers') the noise is particularly troublesome below 100 Hz. The STC curve does not assess walls or other partitions in this frequency range. Materials or wall assemblies should be selected to isolate this low frequency sound.

Various construction techniques and products have emerged to address the problem of noise control, but few are well suited to target these specific problem frequencies. Currently available choices include: additional gypsum drywall layers; the addition of resilient channels plus additional isolated drywall panels and the addition of mass-loaded vinyl barriers plus additional drywall panels; or cellulose-based sound board. All of these changes incrementally help reduce the noise transmission, but not to such an extent that identified problem frequencies would be considered fully mitigated (restoring privacy or comfort). Each method broadly addresses the problem with additional mass, isolation, or damping. In other words, each of these is a general approach, not a frequency specific one.

More recently, an alternative building noise control product having laminated structures utilizing a viscoelastic glue has been introduced to the market. Such structures are disclosed and claimed in U.S. Pat. No. 7,181,891 issued Feb. 27, 2007 to the assignee of the present application. This patent is hereby incorporated by reference herein in its entirety. Laminated structures disclosed and claimed in the '891 Patent include gypsum board layers and these laminated structures (sometimes called "panels") eliminate the need for additional materials such as resilient channels, mass loaded vinyl barriers, and additional layers of drywall during initial construction. The resulting structure improves acoustical performance over the prior art panels by ten or more decibels in some cases. However, the described structures are another general frequency approach. In certain of these structures a single viscoelastic adhesive (with damping) is incorporated into the laminated panel. As will be demonstrated later, such adhesive is designed to damp sound energy within a single frequency band with poorer performance in other sound frequency ranges. For this reason, these structures compromise performance in certain frequency ranges in an attempt to best match the STC curve.

Accordingly, what is needed is a new material and a new method of construction that allows for the maximum reduction of noise transmission at low frequencies, high frequencies, or both simultaneously. What is needed is a panel tuned for performance at multiple problem frequencies.

A figure of merit for the sound attenuating qualities of a material or method of construction is the material's Sound Transmission Class (STC). The STC number is a rating which is used in the architectural field to rate partitions, doors and windows for their effectiveness in reducing the transmission of sound. The rating assigned to a particular partition design is a result of acoustical testing and represents a best fit type of approach to a set of curves that define the sound transmission class. The test is conducted in such a way as to make measurement of the partition independent of the test environment and gives a number for the partition performance only. The STC measurement method is defined by ASTM E90 "Standard Test Method Laboratory Measurement of Airborne Sound Transmission Loss of Building Partitions and Elements," and ASTM E413 "Classification for Sound Insulation," used to calculate STC ratings from the sound transmission loss data for a given structure. These standards are available on the Internet at http://www.astm.org.

A second figure of merit is loss factor of the panel. Loss factor is a property of a material which is a measure of the amount of damping in the material. The higher the loss factor, the greater the damping. The primary effects of increased panel damping are reduction of vibration at resonance, a more rapid decay of free vibrations, an attenuation of structure-borne waves in the panel; and increased sound isolation.

Loss factor is typically given by the Greek symbol "$\eta$". For simple coating materials, the loss factor may be determined by the ASTM test method E756-04 "Standard Test Method for Measuring Vibration-Damping Properties of Materials." This standard is available on the Internet at http://www.astm.org. For more complicated structures, such as the ones described in the present invention, a nonstandard test method or computer model must be employed to predict or measure the composite material loss factor. A loss factor of 0.10 is generally considered a minimum value for significant damping. Compared to this value, most commonly used materials, such as wood, steel, ceramic and gypsum, do not have a high level of damping. For example, steel has a loss factor of about 0.001, gypsum wallboard about 0.03, and aluminum a loss factor of about 0.006.

In order to design or assess the damping properties of a laminated panel that uses constrained layer damping, a predictive model is used such as the well known model first suggested by Ross, Kerwin, and Ungar. The Ross, Kerwin, and Ungar (RKU) model uses a fourth order differential equation for a uniform beam with the sandwich construction of the 3-layer laminated system represented as an equivalent complex stiffness.

The RKU model is covered in detail in the article "*Damping of plate flexural vibrations by means of viscoelastic laminae*" by D. Ross, E. E. Ungar, and E. M. Kerwin—Structural Damping, Section IIASME, 1959, New York, the content of which article is herein incorporated by reference. The topic is also well covered with specific regard to panels by Eric Ungar in Chapter 14, "Damping of Panels" in Noise and Vibration Control edited by Leo Beranek, 1971. An extension of this model to systems with more than three layers has been developed by David Jones in section 8.3 of his book Viscoelastic Vibration Damping. This model is used in all of the predictive calculations used for the present invention.

SUMMARY OF THE INVENTION

In accordance with the present invention, a new laminated structure and associated manufacturing process are disclosed which significantly improves the ability of a wall, ceiling, floor or door to resist the transmission of noise from one room to an adjacent room, or from the exterior to the interior of a room, or from the interior to the exterior of a room at both low frequencies and high frequencies.

In one embodiment the structure comprises a lamination of several different materials. In accordance with one embodiment, a laminated substitute for drywall comprises a first layer of selected thickness gypsum board which is glued to a center constraining material, such as 32 gauge sheet steel. The first adhesive has a shear modulus designed to achieve maximum damping at a target frequency such as 160 Hz. On the second surface of the steel constraining layer, a second layer of selected thickness gypsum board is glued in place using a second adhesive layer. The second adhesive layer has a different shear modulus to achieve maximum damping at a different frequency such as 2500 Hz. In one embodiment, the glue layers are two versions of a specially formulated QuietGlue® adhesive, which is a viscoelastic material available from Serious Materials, 1250 Elko Drive, Sunnyvale, Calif. 94089. In addition to the typical chemicals that make up the QuietGlue® adhesive, additional plasticizing compounds are added to aid the shift of the shear modulus to achieve maximum damping at a different frequency while keeping other adhesive material properties constant.

Formed on the interior surfaces of the two gypsum boards, the glue layer is about 1/16 inch thick. In one instance, a 4 foot×8 foot panel consisting of two 1/4 inch thick gypsum wall board panels laminated over a 30 gauge steel sheet using two 1/16 inch thick layers of glue has a total thickness of approximately 5/8 inch. When used on both sides of a standard single wood stud frame, the assembly has an STC value of approximately 54. For comparison, a similar wall assembly constructed with 1/2 inch thick standard gypsum wallboard has an STC rating of approximately 34. The result is a reduction in noise transmitted through the wall structure of approximately 20 decibels compared to the same structure using common (untreated) gypsum boards of equivalent mass and thickness, and construction effort.

BRIEF DESCRIPTION OF THE DRAWINGS

This invention will be more fully understood in light of the following drawings taken together with the following detailed description in which.

DESCRIPTION OF SOME EMBODIMENTS

The following detailed description is meant to be exemplary only and not limiting. Other embodiments of this invention, such as the number, type, thickness, dimensions, area, shape, and placement order of both external and internal layer materials, will be obvious to those skilled in the art in view of this description.

The process for creating laminated panels in accordance with the present invention takes into account many factors: exact chemical composition of the glue; pressing process; and drying and dehumidification process.

Figure 1:
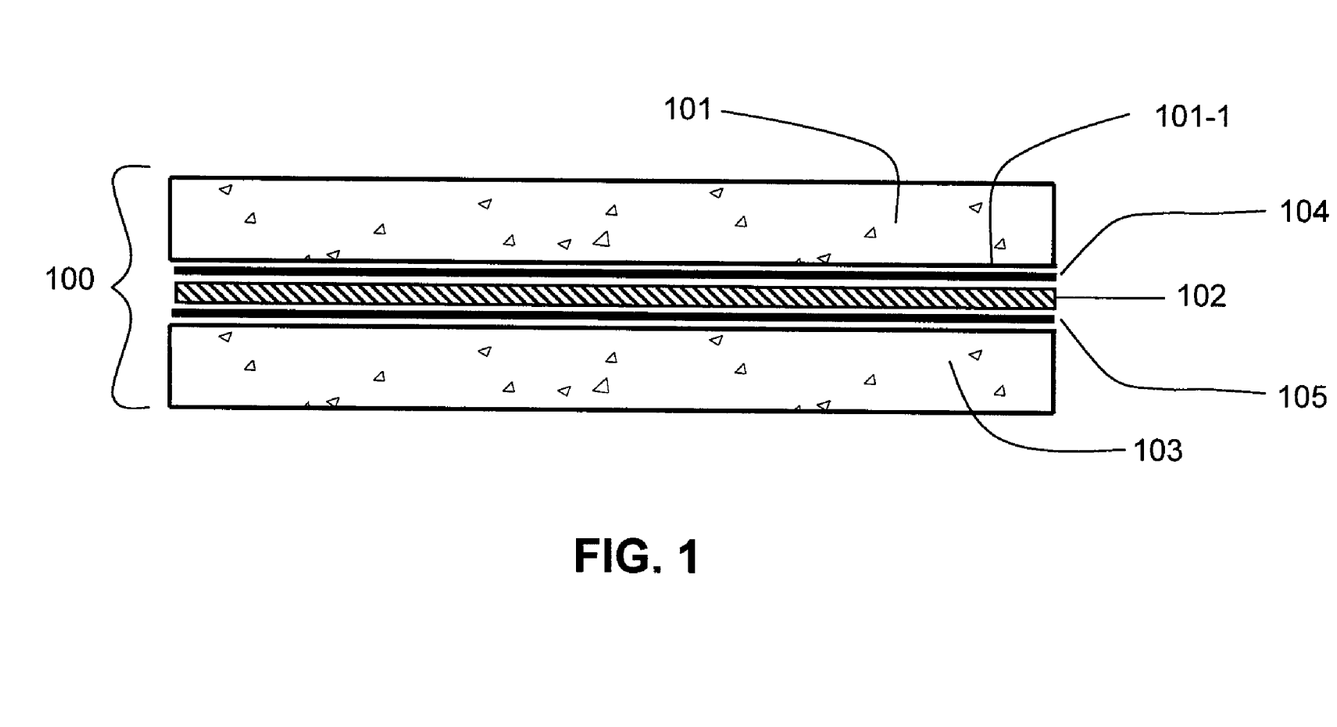
FIG. 1 shows an embodiment of a laminated structure fabricated in accordance with this invention for minimizing the transmission of sound through the material.

FIG. 1 shows laminated structure 100 according to one embodiment of the present invention. In FIG. 1, the layers in the structure are described from top to bottom with the structure oriented horizontally as shown. It should be understood, however, that the laminated structure of this invention will be oriented vertically when placed on vertical walls and doors, as well as horizontally or even at an angle when placed on ceilings and floors. Therefore, the reference to top and bottom layers is to be understood to refer only to these layers as oriented in FIG. 1 and not in the context of the vertical or other use of this structure. In FIG. 1, reference character 100 refers to the entire laminated panel. A top layer 101 is made up of a standard gypsum material and in one embodiment is ¼ inch thick. Of course, many other combinations and thicknesses can be used for any of the layers as desired. The thicknesses are limited only by the acoustical attenuation (i.e., STC rating) desired for the resulting laminated structure and by the weight of the resulting structure which will limit the ability of workers to install the laminated panels on walls, ceilings, floors and doors for its intended use.

The gypsum board in top layer 101 typically is fabricated using standard well-known techniques and thus the method for fabricating the gypsum board will not be described. Alternately, layer 101 may be any one of a layer of cement-based board, wood, magnesium oxide-based board or calcium silicate board. Next, on the bottom surface 101-1 of the gypsum board 101 is a patterned layer of glue 104 called "QuietGlue®" adhesive. Glue 104, made of a viscoelastic polymer modified with additives to give it a prescribed shear modulus upon curing, optimizes the sound dissipation at a specific range of frequencies. Glue layer 104 may have a thickness from about 1/64 inch to about ⅛ inch thickness although other thicknesses may be used. When energy in sound interacts with the glue which is constrained by surrounding layers, the sound energy will be significantly dissipated thereby reducing the sound's amplitude across a target frequency range. As a result, the sound energy which will transmit through the resulting laminated structure is significantly reduced. Typically, glue 104 is made of the materials as set forth in TABLE 1, although other glues having similar characteristics to those set forth directly below Table 1 can also be used in this invention.

An important characteristic of the glue composition and the overall laminated structure is the shear modulus of the glue when cured. The shear modulus can be modified from $10^3$ to $10^7$ N/m² (or Pascals) depending on the frequency range of interest with the given materials of the given ranges listed in Table 1.

TABLE 1

QuietGlue ® Adhesive Chemical Makeup

| COMPONENTS | WEIGHT % | | |
|---|---|---|---|
| | Min | Max | Preferred |
| acrylate polymer | 33.0% | 70.0% | 60% |
| ethyl acrylate, methacrylic acid, polymer with ethyl-2-propenoate | 0.05% | 3.00% | 0.37% |
| hydrophobic silica | 0.00% | 0.500% | 0.21% |
| paraffin oil | 0.10% | 4.00% | 1.95% |
| silicon dioxide | 0.00% | 0.30% | 0.13% |
| sodium carbonate | 0.01% | 1.50% | 0.66% |

TABLE 1-continued

QuietGlue ® Adhesive Chemical Makeup

| COMPONENTS | WEIGHT % | | |
|---|---|---|---|
| | Min | Max | Preferred |
| stearic acid, aluminum salt | 0.00% | 0.30% | 0.13% |
| surfactant | 0.00% | 1.00% | 0.55% |
| rosin ester | 1.00% | 9.00% | 4.96% |
| water | 25.0% | 40.0% | 30.9% |
| 2-Pyridinethiol, 1-oxide, sodium salt | 0.00% | 0.30% | 0.17% |

The preferred formulation is but one example of a viscoelastic glue. Other formulations may be used to achieve similar results and the range given is an example of successful formulations investigated here.

The physical solid-state characteristics of QuietGlue® adhesive include:
1) a broad glass transition temperature below room temperature;
2) mechanical response typical of a rubber (i.e., elongation at break, low elastic modulus);
3) strong peel strength at room temperature;
4) shear modulus between $10^3$ and $10^7$ N/m² at room temperature;
6) does not dissolve in water (swells poorly);
7) peels off the substrate easily at temperature of dry ice; and QuietGlue® adhesive may be obtained from Serious Materials, 1250 Elko Drive, Sunnyvale, Calif. 94089.

Applied to glue layer 104 is a constraining layer 102 made up of gypsum, vinyl, steel, wood, cement or another material suitable for the application. If layer 102 is vinyl, the vinyl is mass loaded and, in one embodiment, has a surface density of one pound per square foot or greater. Mass loaded vinyl is available from a number of manufacturers, including Technifoam, of Minneapolis, Minn. The constraining layer 102 may improve the sound attenuation and physical characteristics of a laminated panel so constructed.

As a further example, constraining layer 102 can be galvanized steel of a thickness such as 30 gauge (0.012 inch thick). Steel has a higher Young's Modulus than vinyl and thus can outperform vinyl as an acoustic constraining layer. However, for other ease-of-cutting reasons, vinyl can be used in the laminated structure in place of steel. Cellulose, wood, plastic, cement or other constraining materials may also be used in place of vinyl or metal. The alternate material can be any type and any appropriate thickness. In the example of FIG. 1, the constraining material 102 approximates the size and shape of the glue layers 104 to which it is applied and to the upper panel 101.

A second layer of viscoelastic glue 105 is applied to the second surface of constraining layer 102. Glue 105 is similar to glue 104 in all ways except for the shear modulus of glue 105 in the cured state. As with glue 104, a prescribed shear modulus allows for optimization of the sound dissipation at a specific range of frequencies. By setting the shear modulus (and therefore target frequency) of glue 105 different from the shear modulus (and therefore the target frequency) of glue layer 104, the laminated panel is able to dissipate two frequency regions simultaneously and improve the overall acoustical attenuation of the panel. By adding one or more additional constraining layers and the required one or more additional glue layers, the laminated panel can be tuned to attenuate three or more target frequency ranges.

Gypsum board layer 103 is placed on the bottom of the structure and carefully pressed in a controlled manner with respect to uniform pressure (measured in pounds per square inch), temperature and time. Alternately, layer 103 may be any one of a layer of cement-based board, wood, magnesium oxide-based board or calcium silicate board.

Finally, the assembly is subjected to dehumidification and drying to allow the panels to dry, typically for forty-eight (48) hours.

In one embodiment of this invention, the glue 104, when spread over the bottom surface 101-1 of top layer 101 or of any other material, is subject to a gas flow for about forty-five seconds to partially dry the glue. The gas can be heated, in which case the flow time may be reduced. The glue 104, when originally spread out over any material to which it is being applied, is liquid. By partially drying out the glue 104, either by air drying for a selected time or by providing a gas flow over the surface of the glue, the glue 104 becomes a sticky paste much like the glue on a tape, commonly termed a pressure sensitive adhesive ("PSA"). The gas flowing over the glue 104 can be, for example, air or dry nitrogen. The gas dehumidifies the glue 104, improving manufacturing throughput compared to the pressing process described for example, in U.S. Pat. No. 7,181,891 wherein the glue 104 would not be dried for an appreciable time prior to placing layer 103 in place.

The second panel, for example the constraining layer 102, is then placed over the glue 104 and pressed against the material beneath the glue 104 (as in the example of FIG. 1, top layer 101) for a selected time at a selected pressure.

A second layer of glue 105 is applied to the surface of the constraining material 102 on the side of constraining material 102 that is facing away from the top layer 101. In one embodiment, glue layer 105 is applied to the interior side of bottom layer 103 instead of being applied to layer 102. A gas can be flowed or forced over glue layer 105 to change glue 105 into PSA, if desired. Bottom layer 103 is placed over the stack of layers 101, 104, 102 and 105. The resulting structure is allowed to set under a pressure of approximately two to five pounds per square inch, depending on the exact requirements of each assembly, for a time which can range from minutes to up to hours, depending on the state of glue layers 104 and 105 in the final assembly. Other pressures may be used as desired.

In one embodiment the glue layers 104 and 105 are about $1/16^{th}$ of an inch thick; however other thicknesses may be used. The glue layers 104 and 105 may be applied with a brush, putty knife, caulking gun, sprayed on, applied using glue tape or well known other means.

Figure 2:
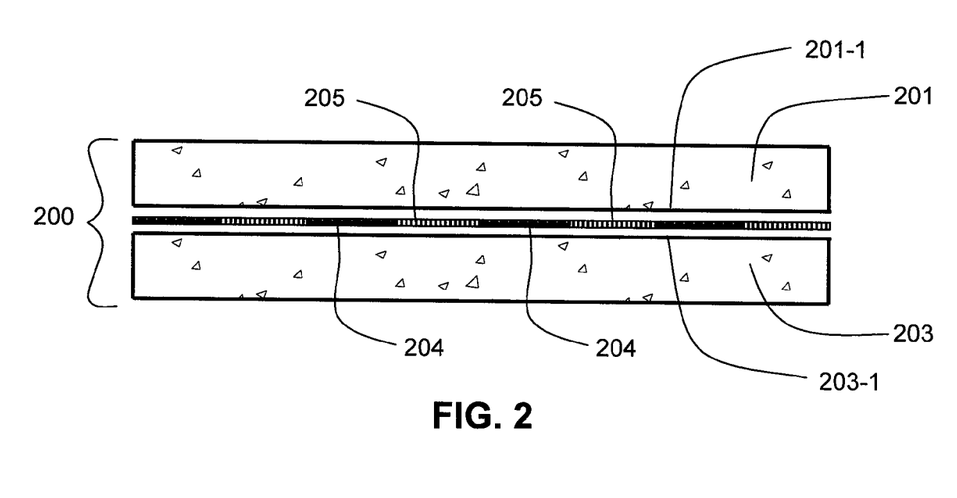
FIG. 2 shows another embodiment of a laminated structure fabricated in accordance with this invention for minimizing the transmission of sound through the material.

FIG. 2 shows a second embodiment of this invention involving a laminated panel 200 in which there is no constraining layer. In FIG. 2, a top layer 101 is made up of standard gypsum material and in one embodiment is 5/16 inch thick. Next, on the bottom surface 201-1 of the gypsum board 201 is a patterned layer of viscoelastic glue 204 called "QuietGlue®" adhesive. The pattern of glue 204 coverage may constitute anywhere from twenty (20) to eighty (80) percent of the surface area 201-1 of gypsum board 201. A second layer of glue 205 is also placed on the bottom surface 201-1 of gypsum board 201. Glue 205 also has a pattern covering from twenty (20) to eighty (80) percent of surface 201-1 and is placed so that it does not materially or substantially overlap glue 204 anywhere on surface 201-1. Glue layers 204 and 205 are physically similar in many ways except for their shear moduli. As with assembly 100, the glues 204 and 205 are designed with different shear moduli to dissipate energy at different frequency ranges. The bottom layer of material 203 is placed over the stack of layers 201, 204 and 205. The resulting structure is allowed to set for a selected time under a pressure of approximately two to five pounds per square inch, depending on the exact requirements of each assembly, although other pressures may be used as desired. The set time under pressure can vary from minutes to hours as described above depending on the state of glues 204 and 205 at the time panel 203 is joined to the assembly.

In fabricating the structure of FIG. 2, the assembly method can be similar to that described for the structure of FIG. 1. In one embodiment of FIG. 2, exterior layers 201 and 203 are gypsum board each having a thickness of 5/16 inch.

Figure 3:
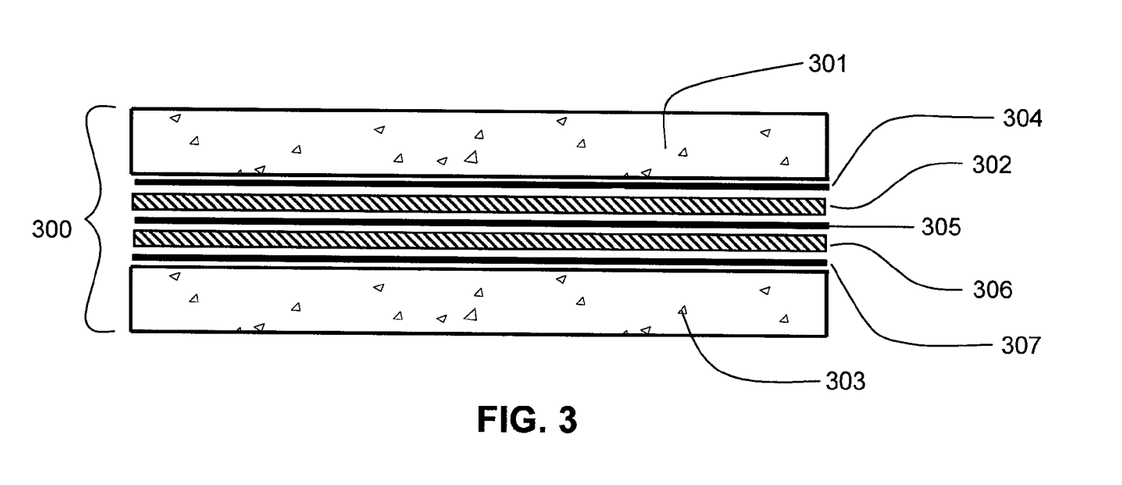
FIG. 3 shows another embodiment of a laminated structure fabricated in accordance with this invention for minimizing the transmission of sound through the material.

FIG. 3 is an example of a third laminated panel 300 in which a second constraining layer 306 and a third glue layer 307 are added to the assembly shown in FIG. 1. Exterior layers 301 and 303 are in one embodiment gypsum board having a thickness of ¼ inch. In fabricating laminated structure 300 of FIG. 3, the method is similar to that described for laminated structures 100 and 200 of FIG. 1 and FIG. 2, respectfully. However, before the bottom layer 303 is applied (bottom layer 303 corresponds to bottom layers 103 and 203 in FIGS. 1 and 2, respectfully) a first constraining material 302 is placed over glue 304. Next, a second layer of glue 305 is applied to the surface of the constraining material on the side of the constraining material that is facing away from the top layer 301. An additional constraining layer 306 and glue layer 307 are placed on the assembly before the final layer 303 is added. In one embodiment the glue layer 305 is applied to the exposed side of the second constraining layer 306. In another embodiment glue layer 307 is applied to the interior side of the bottom layer 303 instead of being applied to constraining layer 306. Suitable materials for constraining layers 302 and 306 are the same as those identified above for constraining layer 102. The bottom layer 303 is placed over the stack of layers 301, 304, 302, 305, 306, and 307. Laminated structure 300 is dried in a prescribed manner under a pressure of approximately two to five pounds per square inch, depending on the exact requirements of each assembly, although other pressures may be used as desired. Drying is typically performed by heating for a time from about 24 to about 48 hours and at a temperature in the range of from about 90° F. to about 120° F. Drying time for the final assembly can be reduced to as little as minutes by flowing, blowing or forcing air or other appropriate gas past each layer of glue to remove liquid such as water from each layer of glue and thus convert the glue into PSA.

Figure 4:
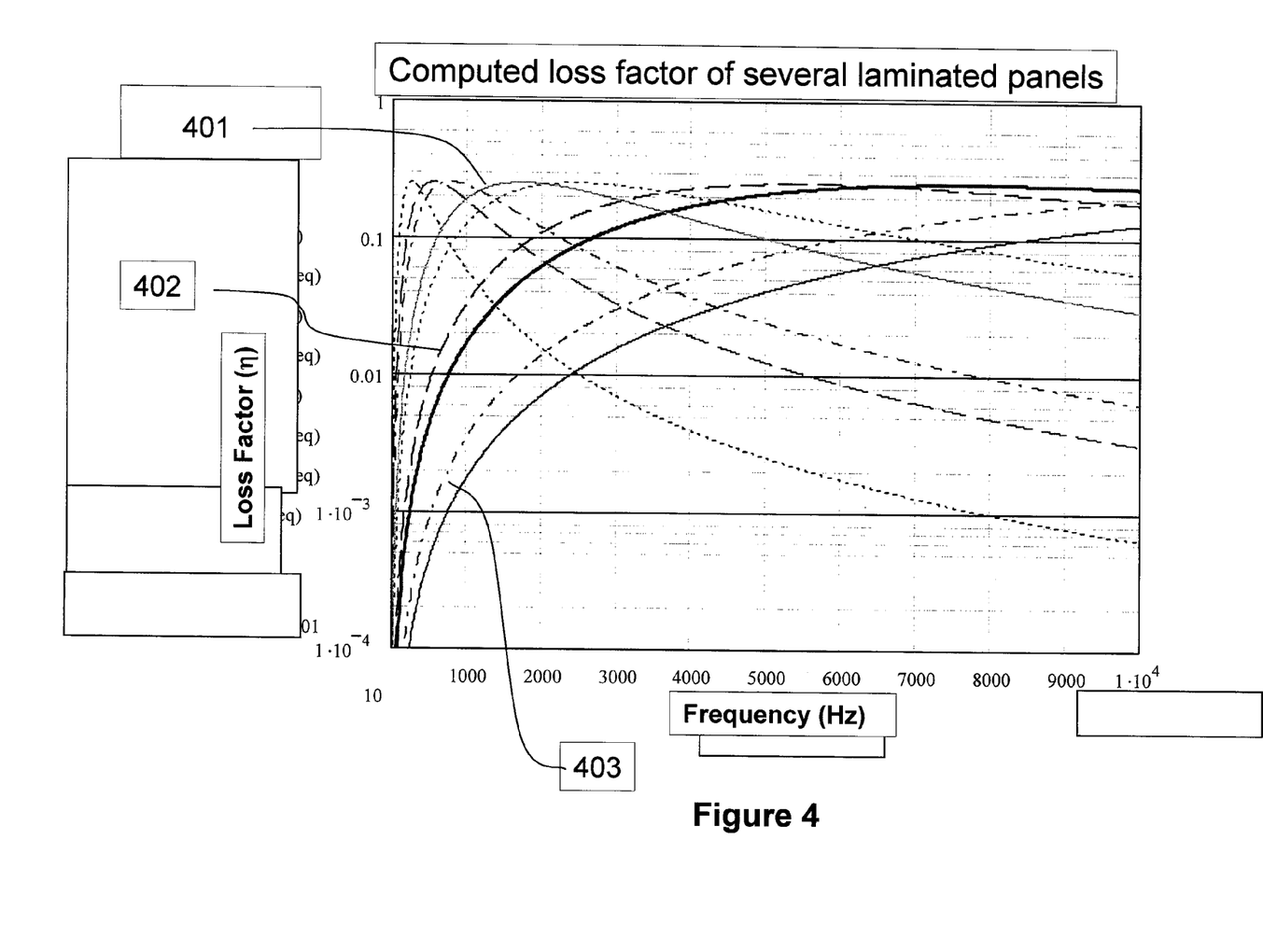
FIG. 4 shows the computed loss factor associated with several laminated panels, each with a single glue formulation.

FIG. 4 shows the calculated loss factors for the embodiment shown in FIG. 1 where both glue layers 104 and 105 have the same given shear modulus. Nine total curves are shown representing glue shear moduli from $10^3$ Pascals (Pa) to $10^7$ Pa. A Pascal is a newton of force per square meter. Curve 401 represents the calculated panel loss factor for laminated panel 100 with glue 104 and glue 105 having a shear modulus $5 \times 10^4$ Pa. Panel 100 has a maximum loss factor of approximately 0.25 at about 1500 Hz. Curve 402 represents the calculated panel loss factor for laminated panel 100 with glues 104 and 105 having a shear modulus $1 \times 10^6$ Pa. Curve 402 shows a maximum loss factor of approximately 0.25 across the frequency range of 6000 Hz to 10,000 Hz. Curve 403 represents the calculated panel loss factor for laminated panel 100 with glues 104 and 105 having a shear modulus $1 \times 10^7$ Pa. Curve 403 shows a maximum loss factor of approximately 0.14 from 10,000 Hz and above.

Figure 5:
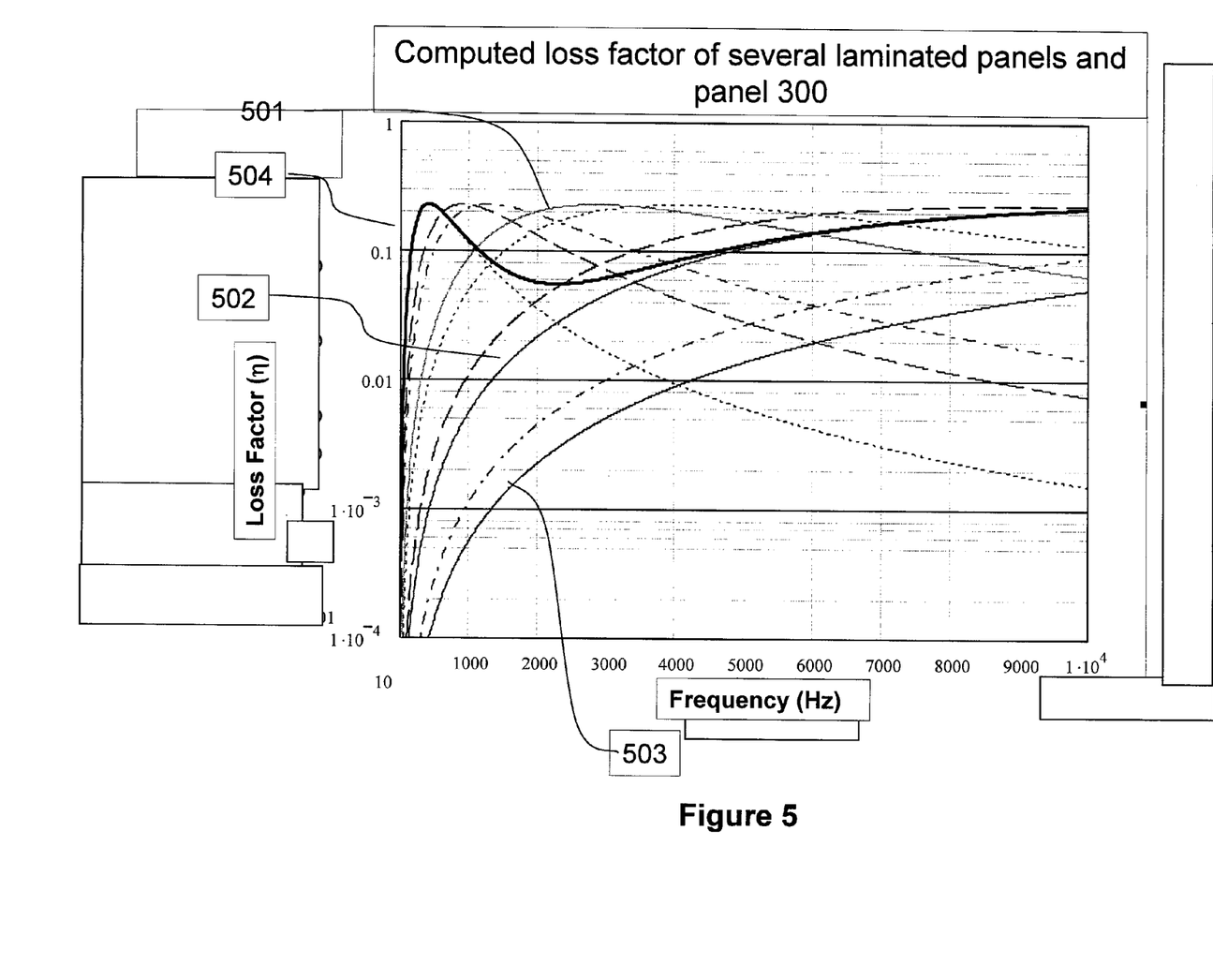
FIG. 5 shows the computed loss factor associated with several laminated panels, each with a single glue formulation and the computed loss factor associated with a dual glue embodiment of the present invention.

FIG. 5 shows the calculated loss factor for the embodiment shown in FIG. 1 where glue layers 104 and 105 have different given shear moduli. Curve 504 represents the predicted loss factor for a panel such as an embodiment shown in FIG. 1 where glue 104 has a shear modulus of $10^3$ Pa and glue 105 has a shear modulus of $10^6$ Pa. As shown by curve 504, the panel 100 with two different glues 104, 105 as described, has a maximum loss factor of 0.25 at around 100 Hz and a loss factor above 0.1 from about 4600 Hz to 10,000 Hz. Curves 501, 502, and 503 (duplicates of curves 401, 402, and 403 respectively in FIG. 4) are shown for comparison of the predicted loss factor associated with panel 100 with two different glues to the predicted loss factor associated with panel 100 with glue layers 104 and 105 having the same shear modulus. It can be seen that the composite performance exceeds that of any other single-glue-formulation-based panel over many, if not all frequencies. Such a dual formula glued panel can address the low and high frequency problems evident in today's typical wall assemblies.

Figure 6:
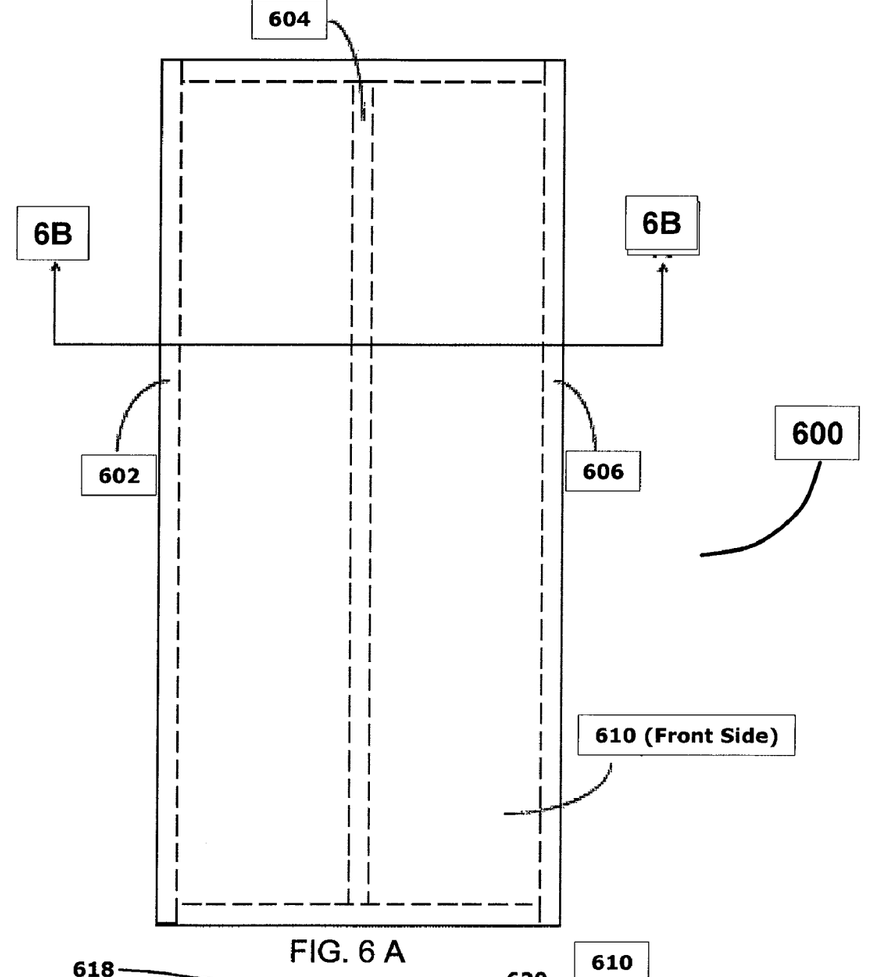
FIG. 6A is a plan view of a wall structure wherein one panel of the wall structure 600 comprises a laminated panel constructed in accordance with an embodiment of the present invention.
FIG. 6B is a cross sectional view taken along lines 6B-6B in FIG. 6.

Referring to FIGS. 6A and 6B, wall assembly 600 is shown. This assembly includes a front side 610 which is constructed using a material such as laminated structure 100 disclosed in FIG. 1, and a rear panel 608 which is a single layer of type X gypsum wallboard. Panels 608 and 610 are attached to 2×4 studs 602, 604 and 606. These will be better appreciated by reference to the cross sectional view of FIG. 6B. Batt-type or blown-in thermal insulation 612 is located in each of cavities 618 and 620 which are enclosed between the 2×4 stud structures.

Figure 7A:
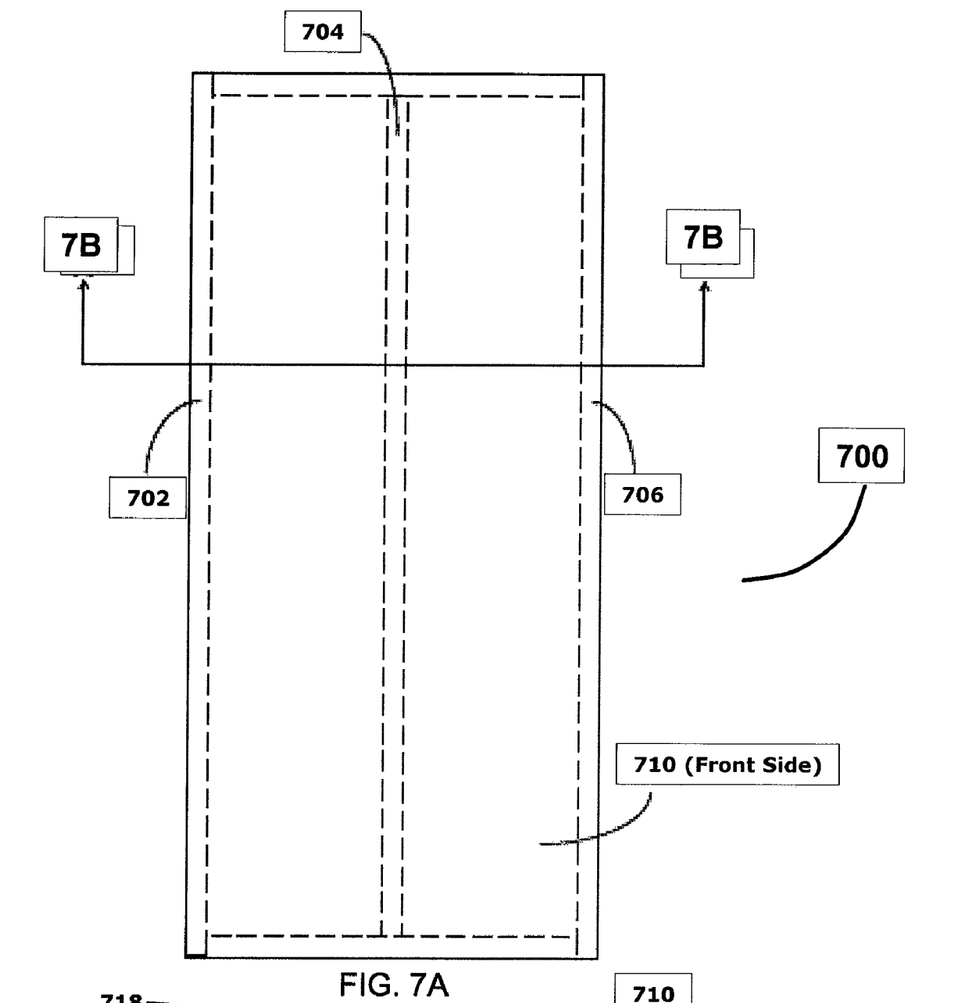
FIG. 7A is a plan view of a wall structure wherein two panels of the wall structure 700 include laminated panels constructed in accordance with the present invention.
Figure 7B:
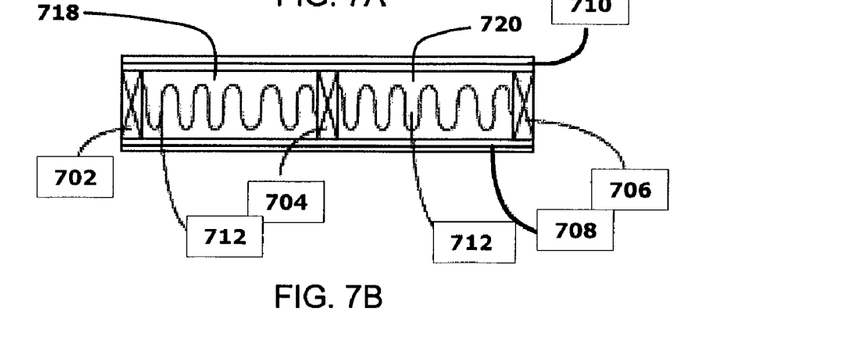
FIG. 7B is a cross view taken along lines 7B-7B in FIG. 7A.

Referring to FIGS. 7A and 7B, wall panel 700 has a front side 710 and back side 708 each using a laminated structure of one quarter inch gypsum board constructed using the laminated structure 100 shown in FIG. 1. As disclosed similarly with regard to FIGS. 6A and 6B, the wall panel assembly 700 includes 2×4 stud structures 702, 704 and 706. In a fashion similar to that shown in FIG. 6B, cavities 718 and 720 include batt-type or equivalent insulation 712. Since wall panel assembly 700 includes laminated front and rear panels, an increased sound transmission class rating is provided and similarly additional fire resistance is also provided.

The dimensions given for each material in the laminated structures of the present invention can be varied in view of cost, overall thickness, weight and desired sound transmission properties. For example, two or more non-overlaping patterns of glue with different shear moduli can be used in the embodiment of FIG. 2 to achieve peak sound attenuation over two or more different frequency ranges. Similarly each layer of glue shown in each of the embodiments of FIGS. 1 and 3 can similarly be made up of two or more patterned glues, each glue having a different and unique shear modulus to provide a panel which achieves peak sound attenuation over as many different frequency ranges as there are different types of glue.

An embodiment of this invention uses two or more glues with different shear moduli in each glue layer in the structure of FIG. 1 or the structure of FIG. 3. Each glue layer can be arranged so that glues with identical shear moduli are directly above or below each other in the different glue layers. Alternatively each glue layer can be arranged so that glues with identical shear moduli are not directly above or below each other in these structures.

As will be apparent from the above description, the structures of that pattern can be tailored to give desired sound attenuation in selected frequency ranges.

The patterns of glue making up each glue layer can be applied in strips or squares or other shapes using brushes or glue applicators of well-known design.

The above-described embodiments and their dimensions are illustrative and not limiting. In addition, further other embodiments of this invention will be obvious in view of the above description.

Accordingly, the laminated structure of this invention provides a significant improvement in the sound transmission class number associated with the structures and thus reduces significantly the sound transmitted from one room to adjacent rooms while simultaneously providing specific additional sound dissipation at multiple frequencies.

Other embodiments of this invention will be obvious in view of the above description.

What is claimed is:

1. A laminated panel for use in building construction comprising:
    a first layer of material having an external surface and an internal surface;
    a second layer of material having an external surface and an internal surface;
    a layer of glue in contact with the internal surface of said first layer of material and with the internal surface of said second layer of material, thereby to bond together the first layer of material and the second layer of material, said layer of glue being made up of at least two different glues, including a first glue having a first shear modulus and a second glue having a second shear modulus; wherein
    said first glue is formed in a first pattern and said second glue is formed in a second pattern such that said first glue does not materially overlap said second glue;
    a third layer of material having an external surface and an internal surface; and
    a second layer of glue in contact with the external surface of said second layer of material and the internal surface of said third layer of material, thereby to bond said third layer of material to said second layer of material; and further
    wherein said second layer of glue has a unique shear modulus different from the shear moduli of said first glue and said second glue thereby to provide to said third layer of glue a peak loss factor in a third frequency range.

2. The panel of claim 1 wherein said second layer of glue is made up of at least two different glues, a third glue and a fourth glue, said third glue having a third shear modulus and said fourth glue having a fourth shear modulus.

3. The panel of claim 1 wherein said third glue is formed in a first pattern and said fourth glue is formed in a second pattern such that said third glue does not materially overlap said fourth glue.

4. The panel of claim 3 wherein said third shear modulus results in said third glue having a third loss factor which is most effective in a third frequency range and said fourth shear modulus results in said fourth glue having a fourth loss factor which is most effective in a fourth frequency range.

5. The panel of claim 3 wherein said third frequency range and said fourth frequency range differ from each other.

6. The panel of claim 3 wherein the frequency at which said third loss factor peaks in said third frequency range differs from the frequency at which said fourth loss factor peaks in said fourth frequency range.

7. The panel of claim 3 wherein the frequency at which said third loss factor peaks in said third frequency range differs from the frequency at which said fourth loss factor peaks in said fourth frequency range in such a manner that the third glue attenuates acoustic energy in a relatively low frequency range and the fourth glue attenuates acoustic energy in a relatively high frequency range.

8. The panel of claim 7 wherein said acoustic energy comprises sound and vibration energy.

9. The panel of claim 8 wherein said acoustic energy comprises airborne sound and structural vibration energy.

10. A method of forming a laminated panel for use in building construction, said method comprising:
- forming a first layer of material having an external surface and an internal surface;
- forming a second layer of material having an external surface and an internal surface;
- placing a layer of glue in contact with the internal surface of said first layer of material and with the internal surface of said second layer of material, thereby to bond together the first layer of material and the second layer of material, said layer of glue being made up of at least two different glues, including a first glue having a first shear modulus and a second glue having a second shear modulus; wherein
- said first glue is formed in a first pattern and said second glue is formed in a second pattern such that said first glue does not materially overlap said second glue;
- forming a third layer of material having an external surface and an internal surface; and
- placing a second layer of glue in contact with the external surface of said second layer of material and the internal surface of said third layer of material, thereby to bond said third layer of material to said second layer of material; and further
- wherein said second layer of glue has a unique shear modulus different from the shear moduli of said first glue and said second glue thereby to provide to said second layer of glue a peak loss factor in a third frequency range.

11. The method of claim 10 wherein said second layer of glue is made up of at least two different glues, a third glue and a fourth glue, said third glue having a third shear modulus and said fourth glue having a fourth shear modulus.

12. The method of claim 11 wherein said third glue is formed in a first pattern and said fourth glue is formed in a second pattern such that said third glue does not materially overlap said fourth glue.

13. The method of claim 11 wherein said third shear modulus results in said third glue having a third loss factor which is most effective in a third frequency range and said fourth shear modulus results in said fourth glue having a fourth loss factor which is most effective in a fourth frequency range.

14. The method of claim 11 wherein said third frequency range and said fourth frequency range differ from each other.

15. The method of claim 11 wherein the frequency at which said third loss factor peaks in said third frequency range differs from the frequency at which said fourth loss factor peaks in said fourth frequency range.

16. The method of claim 11 wherein the frequency at which said third loss factor peaks in said third frequency range differs from the frequency at which said fourth loss factor peaks in said fourth frequency range in such a manner that the third glue attenuates acoustic energy in a relatively low frequency range and the fourth glue attenuates acoustic energy in a relatively high frequency range.

17. The method of claim 16 wherein said acoustic energy comprises sound and vibration energy.

18. The method of claim 17 wherein said acoustic energy comprises airborne sound and structural vibration energy.

* * * * *

UNITED STATES PATENT AND TRADEMARK OFFICE
CERTIFICATE OF CORRECTION

| | | |
|---|---|---|
| PATENT NO. | : 7,745,005 B2 | Page 1 of 1 |
| APPLICATION NO. | : 11/772197 | |
| DATED | : June 29, 2010 | |
| INVENTOR(S) | : Brandon D. Tinianov | |

It is certified that error appears in the above-identified patent and that said Letters Patent is hereby corrected as shown below:

In column 10, line 36, delete the word "third" and insert --second--.

Signed and Sealed this
Sixteenth Day of August, 2011

David J. Kappos
*Director of the United States Patent and Trademark Office*